(12) United States Patent
Sierra et al.

(10) Patent No.: US 8,177,360 B2
(45) Date of Patent: May 15, 2012

(54) MAGNETIC EYEGLASS HINGE

(75) Inventors: Diana Sierra, North Bergen, NJ (US); Eiichi Nakanishi, Osaka (JP)

(73) Assignee: B. Robinson Optical, New York, NY (US)

( * ) Notice: Subject to any disclaimer, the term of this patent is extended or adjusted under 35 U.S.C. 154(b) by 129 days.

(21) Appl. No.: 12/880,300

(22) Filed: Sep. 13, 2010

(65) Prior Publication Data

US 2012/0062831 A1 Mar. 15, 2012

(51) Int. Cl.
*G02C 5/22* (2006.01)
(52) U.S. Cl. .............................. 351/153; 351/121; 16/228
(58) Field of Classification Search ................... 351/121, 351/153; 16/228
See application file for complete search history.

(56) References Cited

U.S. PATENT DOCUMENTS

| | | | |
|---|---|---|---|
| 5,335,025 A | 8/1994 | Wang | |
| 6,089,708 A | 7/2000 | Ku | |
| 6,210,004 B1 * | 4/2001 | Horikawa et al. ............. | 351/153 |
| 6,331,057 B1 | 12/2001 | Strube | |
| 6,352,342 B1 | 3/2002 | Huang | |
| 6,375,324 B2 | 4/2002 | Schleger | |
| 7,794,080 B2 * | 9/2010 | Zelazowski ................... | 351/153 |
| 2006/0146276 A1 | 7/2006 | Park | |
| 2007/0013863 A1 | 1/2007 | Zelazowski | |
| 2007/0132942 A1 | 6/2007 | Zelazowski | |
| 2008/0088791 A1 | 4/2008 | Smith | |

* cited by examiner

*Primary Examiner* — Huy K Mai
(74) *Attorney, Agent, or Firm* — Timothy J. Bechen; Williams Mullen

(57) ABSTRACT

The present invention provides eyeglasses including a frame and an arm connectable to the frame. The eyeglasses include a magnetic hinge connecting the arm to the frame. The magnetic hinge includes a first housing having an first inner cavity and a first outer protruding edge having a plurality of extending flanges disposed thereon, a first magnet disposed inside the first housing, a central washer including at least a portion of the central washer having magnetic attraction capabilities, a second housing having a second inner cavity and an inner lip portion radially disposed within the second inner cavity and a second magnet disposed inside the second housing. The magnetic hinge is magnetically held in place by the magnetic attraction between the first magnet and the second magnet via the central washer and the engagement of the extending flanges within the inner lip portion.

16 Claims, 3 Drawing Sheets

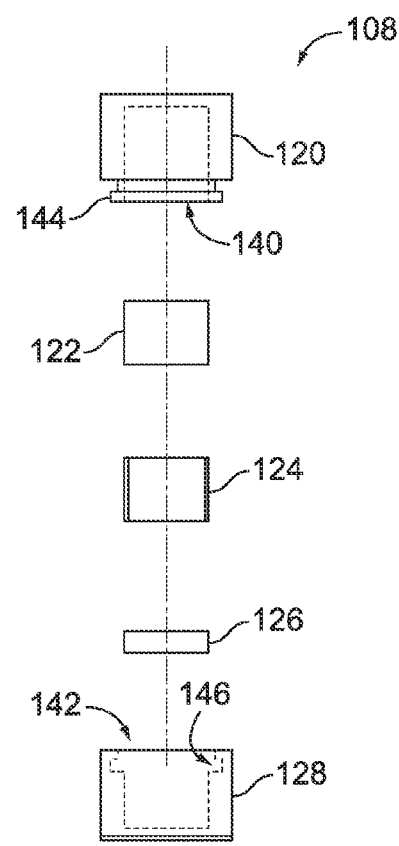
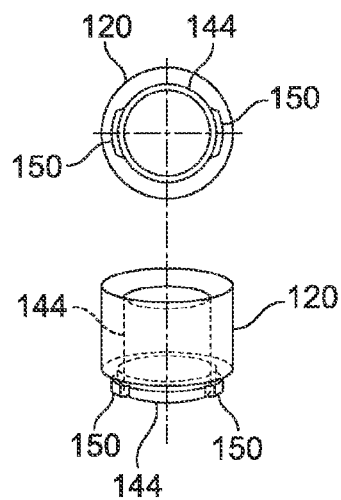
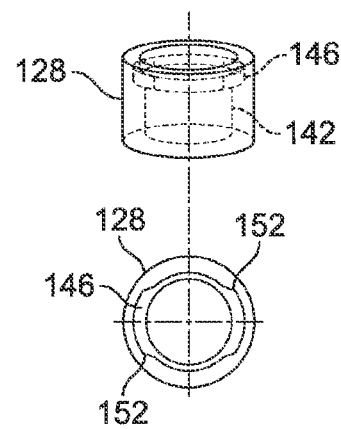
FIG. 4
FIG. 5
FIG. 6
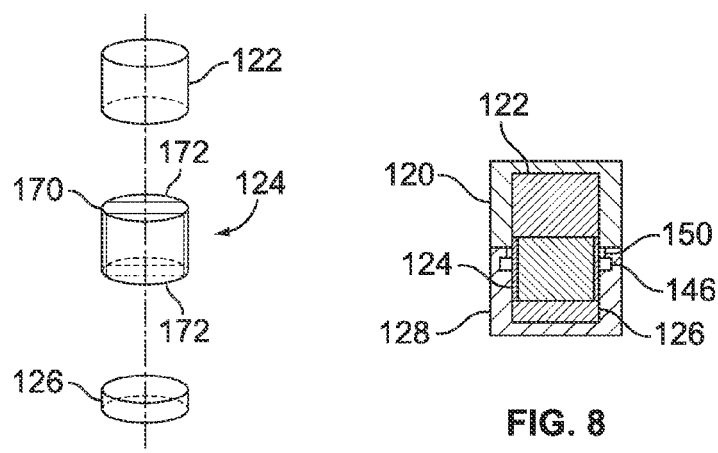
FIG. 7
FIG. 8

MAGNETIC EYEGLASS HINGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to eyeglasses and more specifically to the hinge connecting a lens portion and a temple arm of the eyeglass assembly.

BACKGROUND OF THE INVENTION

Existing eyewear suffers from problems relating to construction and reliability. The costs of the lens, design and materials can be compromised by limiting factors of the eyeglasses, including hinges for closure of a temple arm.

Structurally, eyeglasses are susceptible to failure at various locations, including the nose bridge, as well as the hinge components. These failure points also lead to complications relating to manufacturing, as well as assembly. For example, eyeglasses must conform to safety and production constraints. Not only must eyeglasses be designed for structural integrity for long term use and reliability, the glasses must be designed to allow manufacturing and subsequent repair.

Existing technology in the eyeglasses arts relate to improved structural support on the nose bridge, such as noted in U.S. Pat. No. 6,352,342. Other improvements in the eyeglasses art relate to the pairing of eyeglasses with extra components, such as secondary lenses, such as described in U.S. Pat. No. 6,089,708 or U.S. Pat. No. 6,331,057. Other examples of secondary eyeglass components include a visor described in U.S. Pat. No. 5,335,025. But there are failures in the current eyeglass technology to address the structural failure point of the hinge between the lenses frame and the temple arms.

Attempts have been made to utilize magnets with eyeglasses, such as described in Publication No. 2007/0132942, which describes a two magnet break-away system disposed on the arm of the eyeglasses. The technique of Publication No. 2007/0132942 is directed more for preventing the breaking of the arm and fails to include any rigidity for product safety, as well as means for encapsulating the magnets to hold them in place. Rather, the magnetic system of Publication No. 2007/0132942 provides for the disengagement of the arm when the magnets become unaligned without damage to the arm itself.

The limitations to existing eyeglasses at the frame/arm hinge make existing eyeglasses susceptible to premature breaking. Additionally, these existing hinges having tiny screws are difficult to manufacture, difficult to repair and can have issues satisfying consumer protection constraints relating to the sale and manufacture of these commercial products. Thus, there are extensive construction and material concerns to the structural integrity of existing eyeglasses because of the foregoing limitations of current screw technology.

As such, there exists a need for the design and manufacture of eyeglasses having an improved hinge between the frame and the arm, structural as well as manufacturing improvements.

SUMMARY OF THE INVENTION

The present invention provides eyeglasses including a frame and an arm connectable to the frame. The eyeglasses include a magnetic hinge connecting the arm to the frame. The magnetic hinge includes a first housing having a first inner cavity and a first outer protruding edge having a plurality of extending flanges disposed thereon, a first magnet disposed inside the first housing, a central washer including at least a portion of the central washer having magnetic attraction capabilities, a second housing having a second inner cavity and an inner lip portion radially disposed within the second inner cavity and a second magnet disposed inside the second housing. The magnetic hinge is magnetically held in place by the magnetic attraction between the first magnet and the second magnet via the central washer and the engagement of the extending flanges within the inner lip portion.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 illustrates a planar view of an exploded view of one embodiment of the magnetic hinge;

FIG. 5 illustrates a planar and perspective view of one embodiment of a first housing of the magnetic hinge;

FIG. 6 illustrates a planar and perspective view of one embodiment of a second housing of the magnetic hinge;

FIG. 7 illustrates an exploded perspective view of the interior elements of one embodiment of the magnetic hinge;

FIG. 8 illustrates a cross-sectional view of one embodiment of the magnetic hinge.

DETAILED DESCRIPTION

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
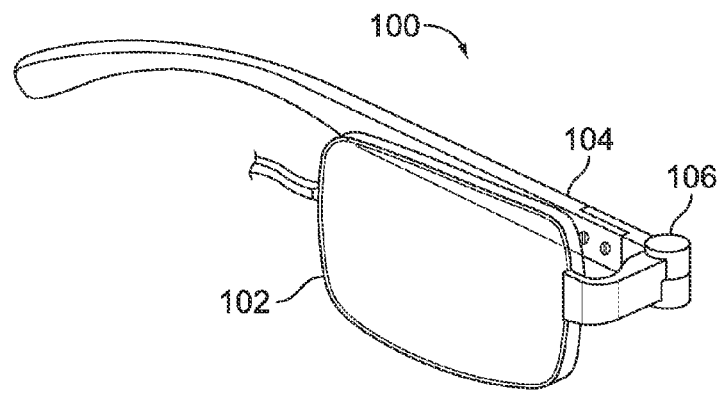
FIG. 1 illustrates a perspective view of a portion of a set of eyeglasses including a magnetic hinge in the closed position.

FIG. 1 illustrates a perspective view of a right side of a pair of eyeglasses 100 including a frame 102 and a temple arm 104. Disposed between the temple arm 104 and the frame 102 is a magnetic hinge 106. It is recognized that the illustration in FIG. 1 represents a right side of the eyeglasses and the mirror portion of the frame and a left side arm and hinge are not illustrated merely for brevity, whereas all included descriptions and various embodiments of the magnetic hinge 106 are equally applicable to the hinge disposed on the right side of the frame 102, as well as being disposed on the left side of the frame 102.

Figure 2:
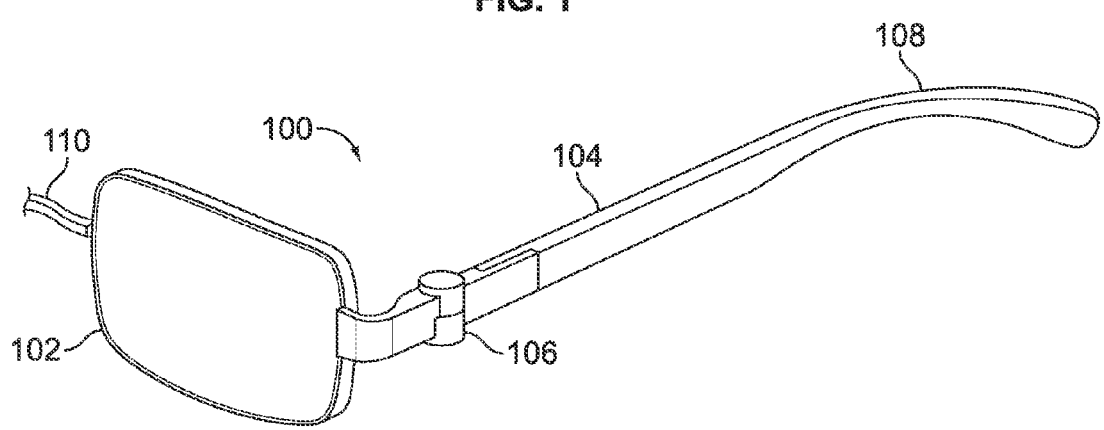
FIG. 2 illustrates another perspective view of a portion of the set of eyeglasses including the magnetic hinge in the open position.

FIG. 1 illustrates the hinge 106 in a closed position so the arm 104 is proximate to the frame 102. By contrast, FIG. 2 illustrates the eyeglasses 100 with the hinge 106 in an open position. In this open position, the arm 104 is extended outward from the frame 102. It is recognized that in a typical embodiment, the closed hinge of FIG. 1 allows for compact storage of the eyeglasses and the open hinge of FIG. 2 provides for a user to wear the glasses. For clarity, in a typical embodiment, the user places the back end 108 of the arm 104 over the user's ears and rests a bridge 110 on the user's nose.

As described in further detail below, the magnetic hinge 106 overcomes the limitations of the prior eyeglass hinge manufacturing. The magnetic hinge 106 excludes screws or other types of mechanical fasteners subject to failure or otherwise complicating manufacturing and/or repair. Whereas prior techniques utilized screws in the hinge assembly, the magnetic hinge 106 maintains its position and rotation of the arm relative to the frame via flange engagement and magnets.

The utilization of the magnetic technology replaces the inferior standard manufacturing process of screws holding into the place the arms and the frame front. As noted above, the inferior prior technique of using screws is susceptible to both manufacturing and product quality constraints. The utilization of the magnetic hinges, as described herein, overcome these constraints and produces superior eyeglasses, superior in both manufacturing and product quality, such as, but not limited to, being less susceptible to breakage.

Figure 3:
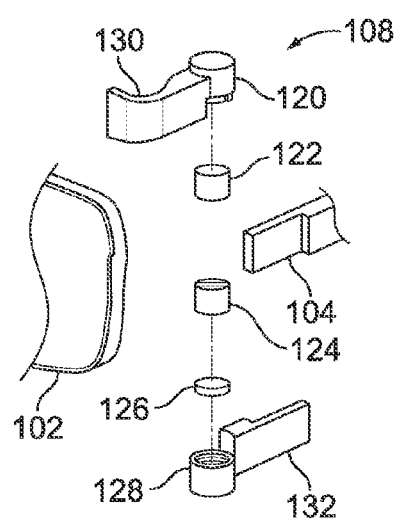
FIG. 3 illustrates an exploded view of one embodiment of the magnetic hinge.

FIG. 3 illustrates an exploded view of one embodiment of the magnetic hinge 108. The hinge 108 is between the frame 102 and arm 104. This embodiment of the magnetic hinge 108 includes a first housing 120, a first magnet 122, a center washer 124, a second magnet 126 and a bottom housing 128.

As illustrated, in this embodiment, the first housing 120 includes a frame extension 130 that connects the first housing 120 to the frame 104. Similarly, the second housing includes an arm extension 132 for connecting to the arm 108. The extension arms 130, 132 may be contactingly engaged to the frame 102 and arm 104, respectively, using any suitable connection means. For example, one embodiment may include using a strong adhesive, whereas another embodiment may include screws or any other suitable type of fastener.

As described in further detail in additional figures below, the first housing 120 includes an inner cavity (not readily visible in FIG. 3) into which the first magnet is encased. Similarly, the second housing 128 also includes an inner cavity for housing the second magnet 126 and at least a portion of the central washer 124. In one embodiment, the magnets 122 and 126 are neodymium magnets. In additional embodiments, the magnets 122 and 126 may be composed of any other suitable type of magnetic material operative to conduct a magnetic force.

In one embodiment, the central washer 124 is composed of a material capable of maintaining magnetic attraction to the magnets 122 and 126, such as metal. In one embodiment, the central washer 124 may also include a central support member providing central stiffness to the washer, where the central support member may be made of any suitable material, not necessarily metal or magnetically conductive material, such as for example plastic.

For further illustration, FIG. 4 illustrates a planar view of one embodiment of the magnetic hinge 108. The first housing member 120 includes the first inner cavity 140 shown in dashed lines to illustrate its interior disposition. In one embodiment, this cavity is a circular cavity inside the interior of the first housing 120. The second housing member 128 includes a second inner cavity 142 shown in dashed lines to illustrate its interior disposition. In one embodiment, this cavity is a circular cavity inside the interior of the second housing 128.

As also illustrated in FIG. 4, the first housing 120 includes a first outer protruding edge 144 that extends downward from the first housing towards the engagement of the second housing. Not readily visible but described in further detail below, the protruding edge 144 includes extending flanges for engaging the second housing. The second housing 128 additionally includes an inner lip portion 146 into which the extending flanges can fittingly engage.

FIG. 4 illustrates the exploded view of one embodiment showing the first housing 120 and the first magnet 122, wherein the first magnet 122 is disposed inside the first housing 120 when assembled. The second magnet 126 and at least a portion of the washer 124 are disposed inside the second housing when assembled, in this embodiment. The portion of the central washer 124 not disposed in second housing 128 extends into the first housing 120.

FIG. 5 illustrates two offsetting views of the first housing 120 to better illustrate one embodiment. The perspective view illustrates the first inner cavity 140 in dashed lines, with the first outer protruding edge 144 and the extending flanges 150. Further visible from the bottom view of the first housing 120, this embodiment provides the two (2) extending flanges 150, which are disposed at the bottom of the first outer protruding edge 144.

In one embodiment, the first housing 120 has a height of approximately 4.1 millimeters and the protruding edge 144 extends out from the bottom of the first housing by a distance of approximately 1 centimeter. In this embodiment, the 1 centimeter of the protruding edge 144 includes a spacing of 0.5 millimeters and the flanges extending downward 0.5 millimeters. In this embodiment, the first housing 120 has an outer diameter of 6.2 millimeters, with the inner cavity 140 having a diameter of approximately 4.05 millimeters. In this embodiment, the protruding edge 144 has a diameter of 4.65 millimeters covering the 0.5 millimeters between the bottom of the first housing 120 and the flanges 150, whereas each flange extends 0.3 millimeters out from the 4.65 centimeter diameter, therefore having an outer diameter distance of 5.25 millimeters. Additionally, in this embodiment, the flange has a circumferential width of approximately 2.75 millimeters. In this embodiment, the first magnet 122 has a height of 3 millimeters and a diameter of 4 millimeters.

FIG. 6 illustrates two offsetting views of the second housing 128 to better illustrate one embodiment. The perspective view illustrates the second inner cavity 142 and the inner lip portion 146. As visible in the top side view of the second housing 128, the inner lip portion 146 includes two cut-away portions 152 that lead to the inner lip portion 146. During assembly, in this embodiment, the extending flanges 150 of FIG. 5 can be inserted into the inner lip portion 146 by extending the flanges 150 through the cut-aways 152 and thus rotating either first housing or the second housing to engage the flanges 150 inside the lip portion 146.

In one embodiment the second housing 128 has a diameter of 6.2 millimeters and the inner cavity 142 having a diameter of 4.05 millimeters. In this embodiment, the inner cavity 142 begins approximately 0.59 millimeters from the bottom of the housing 128, extending upwards to the top of housing 128. Inside the inner cavity 142 is the inner lip portion, which in one embodiment has a diameter of 5.3 millimeters and is positioned 2.48 millimeters up from the bottom of the inner cavity 142. In this embodiment, the inner lip portion 146 has a height of 0.55 millimeters. The inner lip portion 146 is encased by the cut-aways 152 having a diameter equal to the inner lip portion and having a circumferential length of approximately 3.39 millimeters extending around the inner lip 142. As illustrated in FIG. 4, the top portion in the second cavity 142 near to the top edge of the second housing member has a diameter slightly wider than the diameter further inside the housing member. This, along with the 5.3 millimeter portion, forms the lip portion 146, where the diameter of inner cavity near the top of the second housing member is approximately 4.7 millimeters. In this embodiment, the second magnet 126 has a height of approximately 1 millimeter and a diameter of approximately 4 millimeters.

It is recognized that FIGS. 5 and 6 illustrate one embodiment of the mating of the first housing and the second housing the extending flanges 150 inside the inner lip portion 152. Additional embodiments are usable for securing these two housings and thus the magnetic hinge is expressly limited to the multiple flange embodiment described herein. For example, the assembly can include a single flange, adhesive(s) or any other suitable engagement means.

FIG. 7 illustrates a perspective exploded view of the interior elements disposed within the first housing 120 and the second housing 128. In this embodiment, the interior elements include the first magnetic 122, the central washer 124 and the second magnet 126. In this embodiment, the central washer is composed of multiple materials for structural stability. The central washer includes a central structural element 170 and two outer elements 172, collectively forming the cylinder of the central washer. In one embodiment, the central structural element 170 may be made of plastic, the outer elements 172 may be made of metal or other magnetically conductive material and the central washer may be assembled using an adhesive or other similar technique to hold the components 170 and 172 together.

In one embodiment, the central element 170 has a width of 4 millimeters, a length of approximately 3 millimeters and a depth of approximately 1.5 millimeters. In one embodiment, the central element includes curved height-wise edges relative to the two outer elements 172. The two outer elements are semi-cylindrical, such that when matingly engaged with the central support member, the combined washer itself has a height of approximately 3 millimeters and a diameter of approximately 4 millimeters.

It is also recognized that in the illustrated embodiment, the first magnet 122 is larger in size compared with the second magnet 126. This illustrates one embodiment for the engagement of the elements 122, 124 and the 126 inside the inner cavities (140 and 142 of FIG. 4 for example) and is not expressly limited to requiring the structural sizing describing herein.

It is recognized that the above measurements provide one exemplary embodiment and are not explicit limitations limiting the size of the various elements. It is recognized by one skilled in the art that any other suitable sizing of the various elements may be utilized to generate the disclosed magnetic hinge consistent with the description herein.

FIG. 8 illustrates a cross-sectional view of the above-described embodiment with the first housing 120 contactingly engaging the second housing 128. The cross-section illustrates the alignment of the first magnet, the central washer 124 and the second magnet 126. Also visible is the engagement of the extending flanges 150 into the inner lip portion 146.

Figure 9:
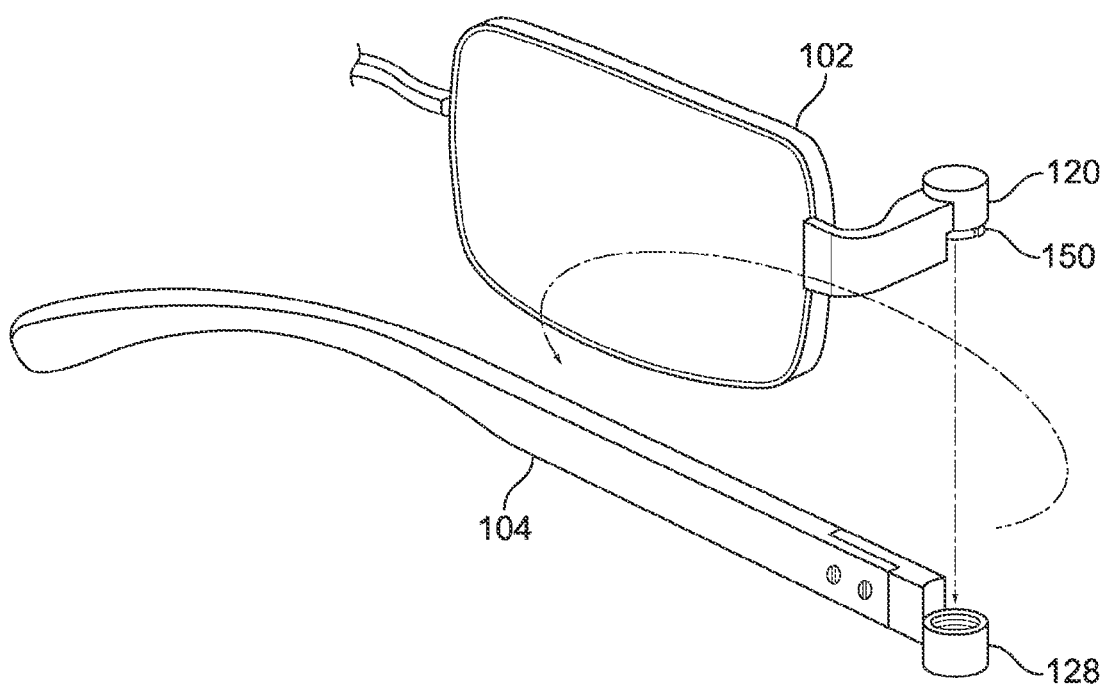
FIG. 9 illustrates one embodiment for the installation of the frame to the arm using the magnetic hinge.

FIG. 9 illustrates one embodiment of the installation of the frame to the arm. In this embodiment, using the extending flanges, the flanges are placed through the cut-aways 152 so they can engage the inner lip portion (not readily visible). Then, when engaged, the arm 104 may be rotated to lockingly engage the first housing 122 and the second housing 128.

Thus, when lockingly engaged, the rotation of the arm from the frame, such as between the locations of FIGS. 1 and 2 above, is based on the magnetic properties of the hinge. The first magnet has a magnetic attraction to the second magnet via the central washer, thus providing a magnetic hinge. This magnetic hinge thereby overcomes the problems associated with the prior techniques and allows for the improved eyeglasses described herein.

Applicants additionally expressly note that the magnetic hinge is equally applicable to both sides of a frame and is operative to connect two arms, one on each side of the frame. The above described figures are equally applicable to a right side arm as well as a left-side arm. For example, a pair of eyeglasses having the magnetic hinges includes a left side arm with a left side magnetic hinge and a right side arm with a right side magnetic hinge. The left arm and the right arm include four magnets, two on each arm, as well as corresponding left side and right components, including housing members and other elements.

FIGS. 1 through 9 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. Eyeglasses comprising:
    a frame;
    an arm connectable to the frame; and
    a magnetic hinge connecting the arm to the frame, the magnetic hinge including:
        a first housing having an first inner cavity and a first outer protruding edge having a plurality of extending flanges disposed thereon;
        a first magnet disposed inside the first housing;
        a central washer including at least a portion of the central washer having magnetic attraction capabilities;
        a second housing having a second inner cavity and an inner lip portion radially disposed within the second inner cavity; and
        a second magnet disposed inside the second housing such that the magnetic hinge is magnetically held in place by the magnetic attraction between the first magnet and the second magnet via the central washer.

2. The eyeglasses of claim 1 further comprising the first housing matingly engaged with the second housing via the extending flanges engaging the inner lip portion.

3. The eyeglasses of claim 1, wherein the central washer is made of metal.

4. The eyeglasses of claim 1, wherein the first magnet and the second magnet is made of neodymium.

5. The eyeglasses of claim 1, wherein the central washer includes a center cavity and a structural support member disposed within the center cavity.

6. The eyeglasses of claim 5, wherein the structural support member is plastic.

7. The eyeglasses of claim 1 further comprising:
a frame extension extending from the frame, the frame extension having the first housing member attached thereto; and
an arm extension extending from the arm, the frame extension having the second housing member attached thereto.

8. The eyeglasses of claim 7, wherein the frame and the arm are magnetically engaged and secured by the placement of the flanges on the first housing inside the second inner cavity of the second housing and rotating the frame to lockingly engage the flanges inside the inner cavity.

9. The eyeglasses of claim 1 further comprising:
an arm extension extending from the arm, the frame extension having the first housing member attached thereto; and
a frame extension extending from the frame, the frame extension having the second housing member attached thereto.

10. The eyeglasses of claim 9, wherein the frame and the arm are magnetically engaged and secured by the placement of the flanges on the first housing inside the second inner cavity of the second housing and rotating the frame to lockingly engage the flanges inside the inner cavity.

11. Eyeglasses comprising:
a frame having a frame extension extending therefrom;
the frame extension including a first housing having an first inner cavity and a first outer protruding edge having a plurality of extending flanges disposed thereon;
an arm having an arm extension extending therefrom the arm;
the arm extension including a second housing having a second inner cavity and an inner lip portion radially disposed within the second inner cavity;
a first magnet disposed inside the first housing;
a second magnet disposed inside the second housing; and
a central washer including at least a portion of the central washer having magnetic attraction capabilities, the central washer magnetically engaging both the first magnet and the second magnet;
wherein the frame extension is securingly engaged to the arm extension by the magnetic attraction between the first magnet and the second magnet via the central washer and by the placement of the flanges on the first housing inside the second inner cavity of the second housing.

12. Eyeglasses comprising:
a frame;
a left arm connected to the frame;
a right arm connected to the frame;
a left magnetic hinge connecting the left arm to the frame, the left magnetic hinge including:
a first housing having an first inner cavity and a first outer protruding edge having a plurality of extending flanges disposed thereon;
a first magnet disposed inside the first housing;
a first central washer including at least a portion of the central washer having magnetic attraction capabilities;
a second housing having a second inner cavity and an inner lip portion radially disposed within the second inner cavity; and
a second magnet disposed inside the second housing such that the magnetic hinge is magnetically held in place by the magnetic attraction between the first magnet and the second magnet via the central washer and by the placement of the flanges on the first housing inside the second inner cavity of the second housing; and
a right magnetic hinge connecting the right arm to the frame, the right magnetic hinge including:
a third housing having an third inner cavity and a third outer protruding edge having a plurality of extending flanges disposed thereon;
a third magnet disposed inside the third housing;
a second central washer including at least a portion of the central washer having magnetic attraction capabilities;
a fourth housing having a fourth inner cavity and an inner lip portion radially disposed within the fourth inner cavity; and
a fourth magnet disposed inside the fourth housing such that the magnetic hinge is magnetically held in place by the magnetic attraction between the first magnet and the second magnet via the central washer and by the placement of the flanges on the third housing inside the fourth inner cavity of the fourth housing.

13. The eyeglasses of claim 12, wherein the central washer is made of metal.

14. The eyeglasses of claim 12, wherein the first magnet and the second magnet is made of neodymium.

15. The eyeglasses of claim 12, wherein the central washer includes a center cavity and a structural support member disposed within the center cavity.

16. The eyeglasses of claim 15, wherein the structural support member is plastic.

* * * * *